United States Patent
Chien et al.

(10) Patent No.: US 10,683,575 B2
(45) Date of Patent: Jun. 16, 2020

(54) LASER CLADDING NOZZLE APPARATUS AND PUNCTURING METHOD THEREFOR

(71) Applicant: FUJIAN UNIVERSITY OF TECHNOLOGY, Fuzhou (CN)

(72) Inventors: Ming-Te Chien, Fuzhou (CN); Guofu Lian, Fuzhou (CN); Mingpu Yao, Fuzhou (CN)

(73) Assignee: FUJIAN UNIVERSITY OF TECHNOLOGY, Fuzhou (CN)

( * ) Notice: Subject to any disclaimer, the term of this patent is extended or adjusted under 35 U.S.C. 154(b) by 0 days.

(21) Appl. No.: 16/056,902

(22) Filed: Aug. 7, 2018

(65) Prior Publication Data
US 2019/0048474 A1    Feb. 14, 2019

(30) Foreign Application Priority Data
Aug. 11, 2017 (CN) .......................... 2017 1 0685429

(51) Int. Cl.
| B05B 7/16 | (2006.01) |
| B05C 19/00 | (2006.01) |
| B05C 11/00 | (2006.01) |
| C23C 14/00 | (2006.01) |
| C23C 24/10 | (2006.01) |
| B23K 26/34 | (2014.01) |
| B23K 26/14 | (2014.01) |
| B05B 7/22 | (2006.01) |

(52) U.S. Cl.
CPC .............. *C23C 24/10* (2013.01); *B05B 7/228* (2013.01); *B05C 19/001* (2013.01); *B23K 26/1476* (2013.01); *B23K 26/34* (2013.01)

(58) Field of Classification Search
USPC ................ 118/300, 313–315, 641–643, 308; 219/121.6, 121.63, 121.84
See application file for complete search history.

(56) References Cited

U.S. PATENT DOCUMENTS

2015/0196975 A1* 7/2015 Sato .................... B23K 26/1476
239/135
2017/0002978 A1* 1/2017 Ballinger .................. F17C 1/08

FOREIGN PATENT DOCUMENTS

CN              1570190 A    *   1/2005

OTHER PUBLICATIONS

English Translation CN1271236—Original Doc CN1570190A (Year: 2006).*

* cited by examiner

*Primary Examiner* — Yewebdar T Tadesse
(74) *Attorney, Agent, or Firm* — WPAT, PC

(57) ABSTRACT

The present invention provides a laser cladding nozzle apparatus, where the laser cladding nozzle apparatus is mounted on a laser head, and the laser cladding nozzle apparatus includes a conical nozzle head, where the conical nozzle head is connected to an inner side of the laser head; the conical nozzle head includes a plurality of first powder channels, a plurality of first inlets is evenly distributed on an upper end circumference of the conical nozzle head, a plurality of first outlets is evenly distributed on a lower end circumference of the conical nozzle head, the first inlet is in communication with the first outlet through the first powder channel, and a size and a quantity of the first inlet are the same as those of the first outlet. The present invention further provides a puncturing method for a laser cladding nozzle apparatus.

4 Claims, 6 Drawing Sheets

LASER CLADDING NOZZLE APPARATUS AND PUNCTURING METHOD THEREFOR

BACKGROUND

Technical Field

The present invention relates to the field of laser processing technologies, and in particular, to a laser cladding nozzle apparatus.

Related Art

A laser cladding technology emerged in the 1980s and is an advanced technology for strengthening, modifying and repairing a surface of a metal component. This is specifically a manufacturing method that significantly improves wear resistance, corrosion resistance, heat resistance, oxidation resistance and the like of a surface of a substrate by placing a selected coating material on the surface of the to-be-coated substrate by using different material addition methods, using laser radiation to synchronously melt the coating material and a thin layer on the surface of the substrate, and forming a surface coating layer having an extremely low dilution and metallurgically bonded with the substrate after the melted part fast solidifies.

During laser cladding processing, an entire powder feeding apparatus may be divided into two parts, namely, a power feeder and a powder feeding nozzle. The powder feeding nozzle is used for converting powder flows sent by the powder feeder into different shapes and sending the powder flows to laser beams to implement required processing. Powder is transferred to a substrate through the nozzle structure. Therefore, whether powder block occurs in the nozzle structure greatly affects cladding quality. A structure and the performance of the nozzle directly affect the overall processing effect.

In a conventional nozzle apparatus, powder flows out through a gap between a nozzle head and a nozzle cover. Because the gap is small, block is easily caused and powder convergence is poor, leading to low powder utilization. Most devices can only feed micron powder.

SUMMARY

A first technical problem to be resolved in the present invention is to provide a laser cladding nozzle apparatus. The laser cladding nozzle apparatus is simple in structure and high in powder converging precision. This improves light powder coupling precision and ensures powder collimation and powder utilization.

The first technical problem of the present invention is implemented as follows:

A laser cladding nozzle apparatus, where the laser cladding nozzle apparatus is mounted on a laser head, and the laser cladding nozzle apparatus comprises a conical nozzle head, where the conical nozzle head is connected to an inner side of the laser head; the conical nozzle head comprises a plurality of first powder channels, a plurality of first inlets is evenly distributed on an upper end circumference of the conical nozzle head, a plurality of first outlets is evenly distributed on a lower end circumference of the conical nozzle head, the first inlet is in communication with the first outlet through the first powder channel, and a size and a quantity of the first inlet are the same as those of the first outlet.

Further, the first inlet and the first outlet are of a circular hole shape, the first inlet is provided on a middle portion of the upper end circumference of the conical nozzle head, and the first outlet is provided on a middle portion of the lower end circumference of the conical nozzle head.

Further, the first inlet and the first outlet are of a semi-circular hole shape, the first inlet is provided on an outer end portion of the upper end circumference of the conical nozzle head, the first outlet is provided on an outer end portion of the lower end circumference of the conical nozzle head, and the first powder channel is provided on an outer wall of the conical nozzle head.

Further, the laser cladding nozzle apparatus further comprises a conical nozzle cover, where the conical nozzle head is sleeved in the conical nozzle cover, a second powder channel matching the first powder channel is provided on an inner wall of the conical nozzle cover, a second inlet matching the first inlet is provided on an inner end portion of the upper end circumference of the conical nozzle head, and a second outlet matching the first outlet is provided on an inner end portion of the lower end circumference of the conical nozzle head.

Further, the laser cladding nozzle apparatus further comprises a cover, where the cover is sleeved on an upper end portion of the conical nozzle cover and is connected to an outer side of the laser head.

A second technical problem to be resolved by the present invention is to provide a puncturing method for a laser cladding nozzle apparatus. The puncturing method is simple and is high in powder converging precision. This improves light powder coupling precision and ensures powder collimation and powder utilization.

The second technical problem of the present invention is implemented as follows:

A puncturing method for a laser cladding nozzle apparatus, where the puncturing method requires the laser cladding nozzle apparatus described above, and the puncturing method comprises the following steps:

step 1: determining a particle size of cladding powder according to a type of the cladding powder, and determining a diameter of the first outlet on the lower end of the conical nozzle head according to the particle size of the cladding powder;

step 2: determining a quantity of the first outlet according to a lower end inner circumference of the conical nozzle head and the diameter of the first outlet, where a calculation formula is:

the quantity of the first outlet=the lower end inner circumference of the conical nozzle head÷the diameter of the first outlet; and step 3: performing puncturing processing, according to the diameter and the quantity of the first outlet, on corresponding positions on the conical nozzle head for the first inlet, the first powder channel and the first outlet. The present invention has the following advantages:

In the present invention, puncturing is performed on the conical nozzle head, so that powder flowing is relatively independent and gaps are larger, making powder block not prone to occur. In this way, cladding quality is not affected and powder converging precision is high, thereby improving light powder coupling precision and ensuring powder collimation and powder utilization.

Figure 1:
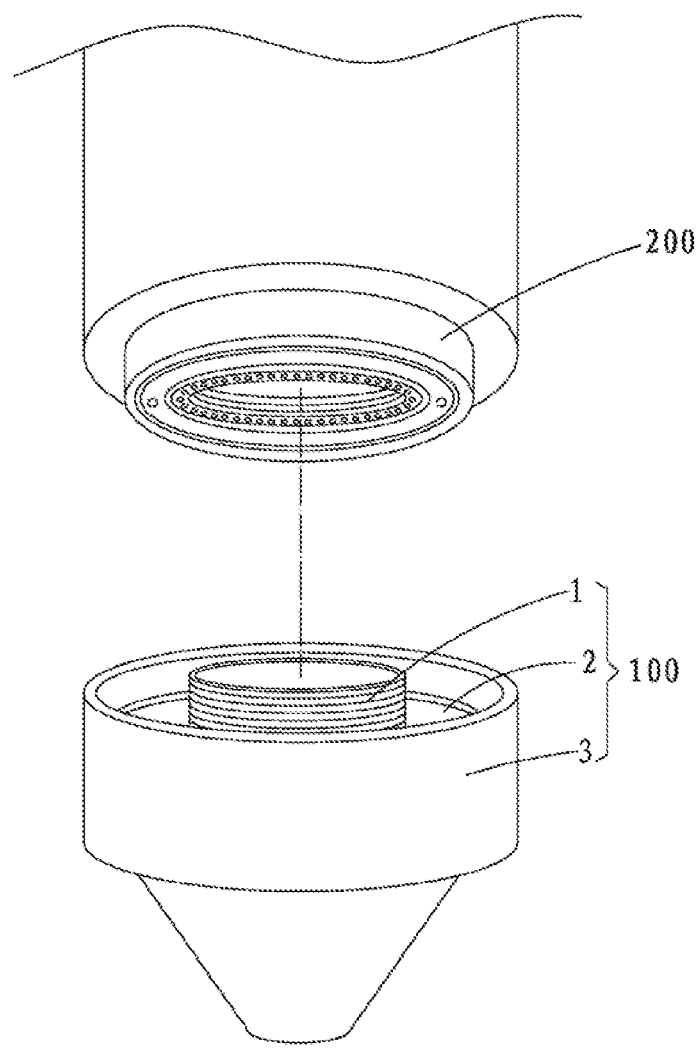
FIG. 1 is a schematic structural diagram of a laser cladding nozzle apparatus mounted on a laser head according to the present invention.
Figure 2:
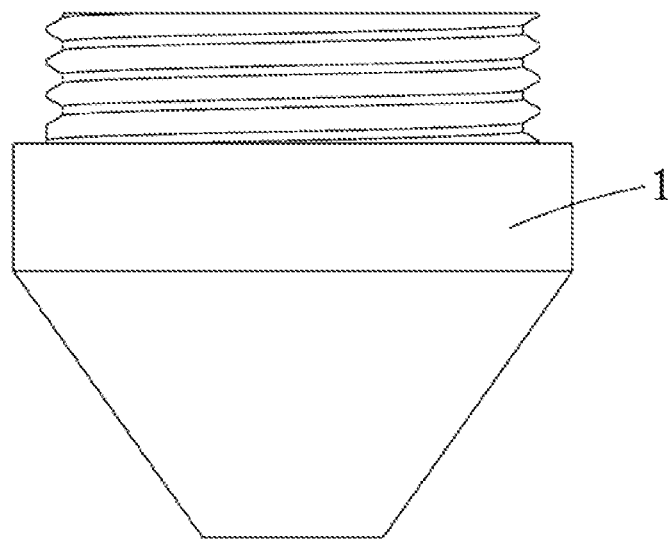
FIG. 2 is a front view of a conical nozzle head in Embodiment 1 of a laser cladding nozzle apparatus according to the present invention.
Figure 3:
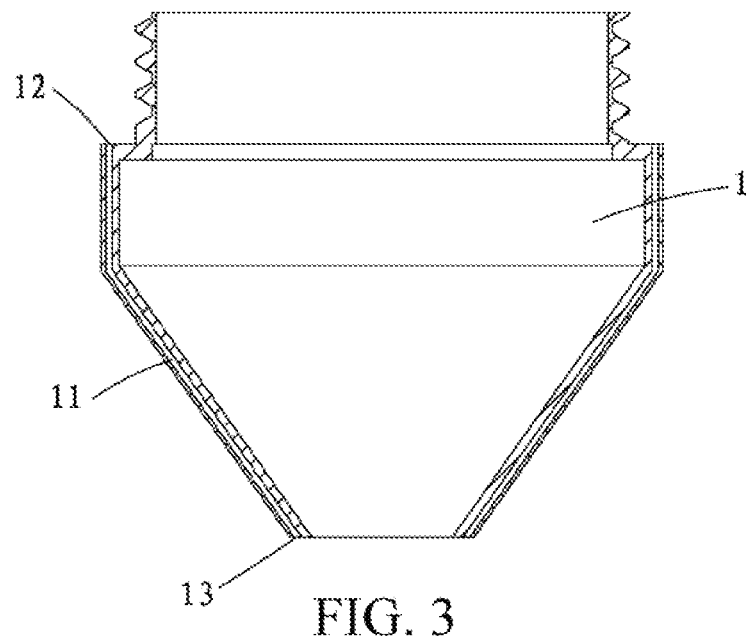
FIG. 3 is a longitudinal sectional view of FIG. 1.
Figure 4:
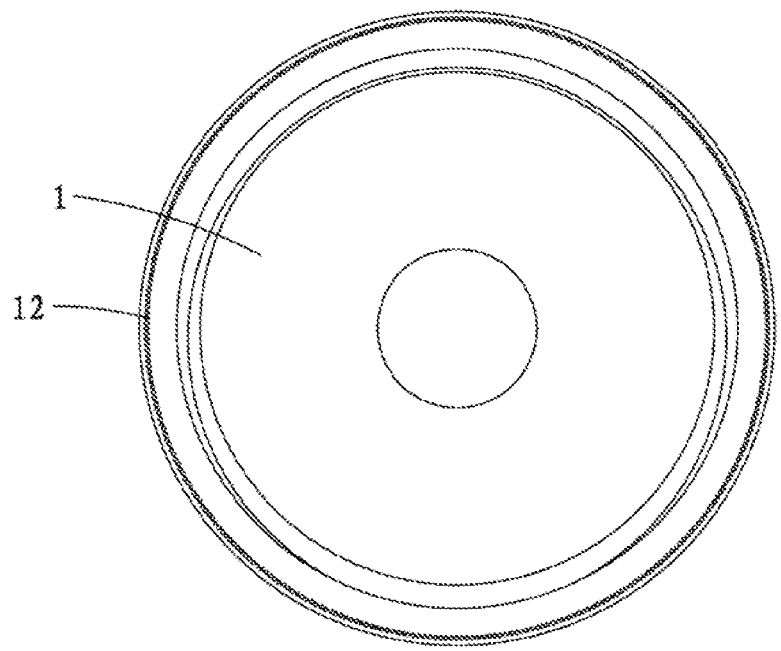
FIG. 4 is a top view of a conical nozzle head in Embodiment 1 of a laser cladding nozzle apparatus according to the present invention.
Figure 5:
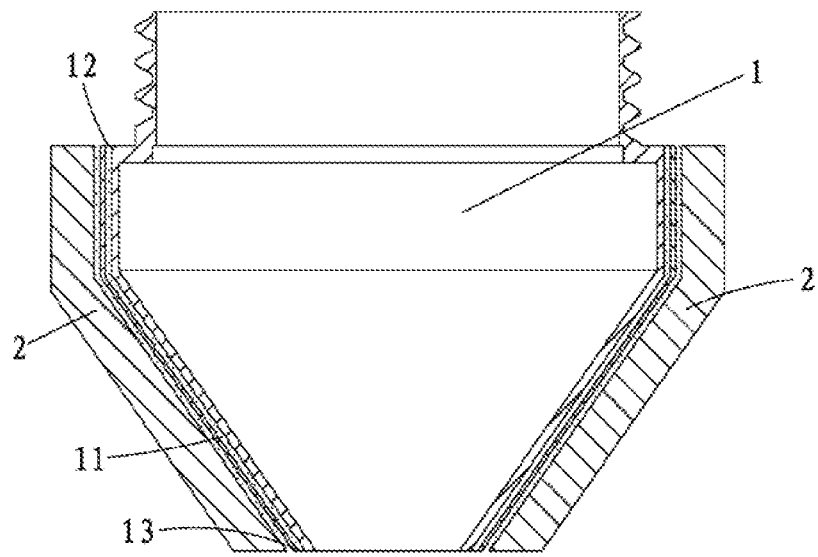
FIG. 5 is a diagram of engagement between a conical nozzle head and a conical nozzle cover in Embodiment 1 a laser cladding nozzle apparatus according to the present invention.
Figure 6:
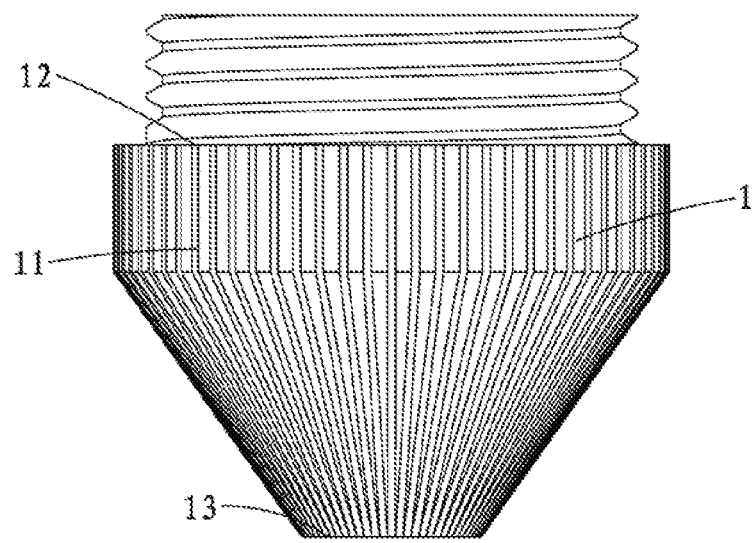
FIG. 6 is a front view of a conical nozzle head in Embodiment 2 of a laser cladding nozzle apparatus according to the present invention.
Figure 7:
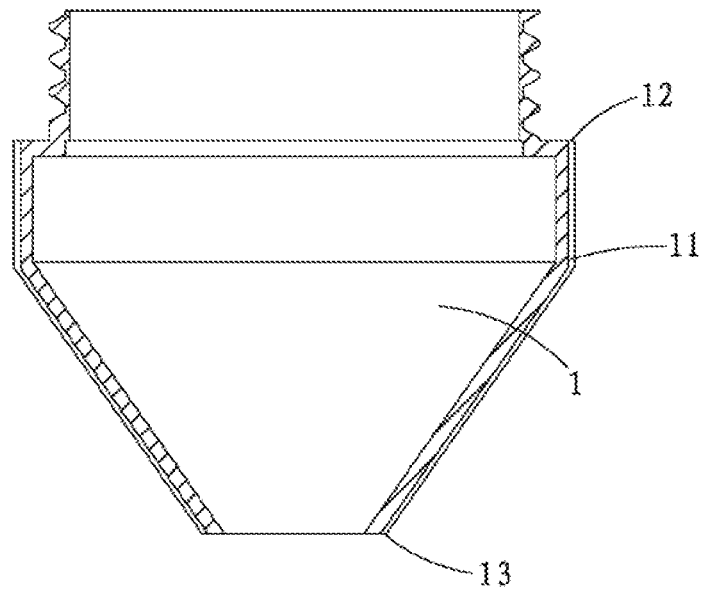
FIG. 7 is a longitudinal sectional view of FIG. 5.
Figure 8:
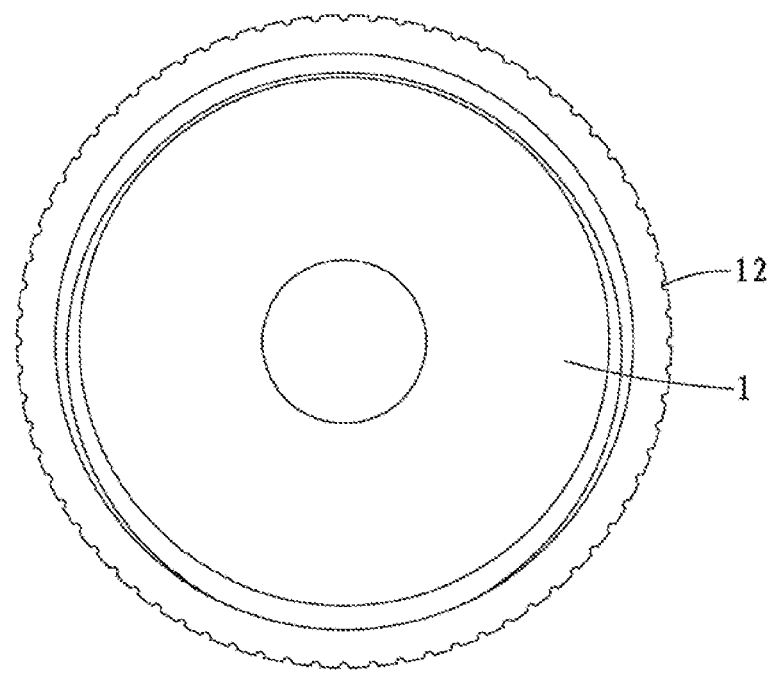
FIG. 8 is a top view of a conical nozzle head in Embodiment 2 of a laser cladding nozzle apparatus according to the present invention.
Figure 9:
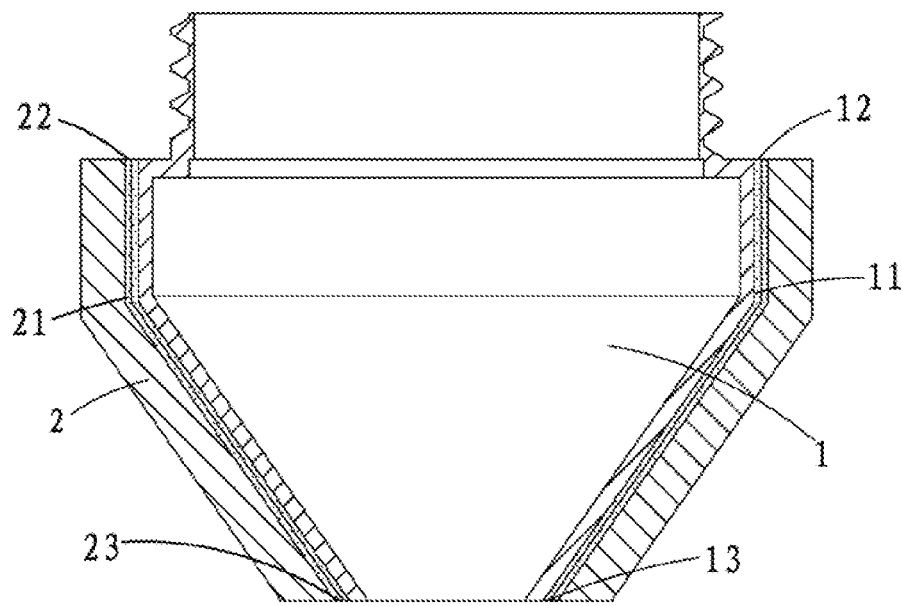
FIG. 9 is a diagram of engagement between a conical nozzle head and a conical nozzle cover in Embodiment 2 a laser cladding nozzle apparatus according to the present invention.

DESCRIPTIONS OF REFERENCE NUMBERS IN THE FIGURES laser cladding nozzle apparatus 100, conical nozzle head 1, first powder channel 11, first inlet 12, first outlet 13, conical nozzle cover 2, second powder channel 21, second inlet 22, second outlet 23, cover 3, and laser head 200.

DETAILED DESCRIPTION

To make the present invention more comprehensible, detailed description is performed below by using a preferred embodiment with the accompanying drawings.

As shown in FIG. 1, FIG. 1 shows a laser cladding nozzle apparatus according to the present invention. The laser cladding nozzle apparatus 100 is mounted on a laser head 200, and the laser cladding nozzle apparatus 100 includes: a conical nozzle head 1, a conical nozzle cover 2 and a cover 3, where the conical nozzle head 1 is threadly connected to an inner side of the laser head 200; the conical nozzle head 1 is sleeved in the conical nozzle cover 2, and the cover 3 is sleeved on an upper end portion of the conical nozzle cover 2 and is threadly connected to an outer side of the laser head 200.

The conical nozzle head 1 includes a plurality of first powder channels 11, a plurality of first inlets 12 is evenly distributed on an upper end circumference of the conical nozzle head 1, a plurality of first outlets 13 is evenly distributed on a lower end circumference of the conical nozzle head 1, the first inlet 12 is in communication with the first outlet 13 through the first powder channel 11, and a size and a quantity of the first inlet 12 are the same as those of the first outlet 13.

Embodiment 1

As shown in FIG. 2 to FIG. 5, the first inlet 12 and the first outlet 13 are of a circular hole shape, the first powder channel 11 is of a cylinder shape; and the first inlet 12 is provided on a middle portion of the upper end circumference of the conical nozzle head 1, and the first outlet 13 is provided on a middle portion of the lower end circumference of the conical nozzle head 1. A cavity of the conical nozzle head 1 is used as a laser inlet. The first inlet 12 is used as a cladding powder inlet, and the cladding powder sequentially passes through the first inlet 12, the first powder channel 11 and the first outlet 13 before flowing in. A groove on an upper end of the conical nozzle cover 2 is used as a cooling water inlet. When a laser cladding operation starts, a cladding material is added to a surface of a substrate and the cladding material melts and solidifies together with a thin layer on the surface of the substrate by using a laser beam with a high energy density, so that a material addition cladding layer metallurgically bonded with the surface of the substrate is formed on the surface of the substrate. In the present invention, in a powder feeding process, powder can not only flow in through gaps between the conical nozzle head 1 and the conical nozzle cover 2, but also through the first inlet 12, thereby improving powder feeding efficiency.

Embodiment 2

As shown in FIG. 6 to FIG. 9, the first inlet 12 and the first outlet 13 are of a semi-circular hole shape, and the first powder channel 11 is of a semi-cylinder shape; the first inlet 12 is provided on an outer end portion of the upper end circumference of the conical nozzle head 1, the first outlet 13 is provided on an outer end portion of the lower end circumference of the conical nozzle head, and the first powder channel 11 is provided on an outer wall of the conical nozzle head 1.

A second powder channel 21 matching the first powder channel 11 is provided on an inner wall of the conical nozzle cover 2, a second inlet 22 matching the first inlet 12 is provided on an inner end portion of the upper end circumference of the conical nozzle head 1, and a second outlet 23 matching the first outlet 13 is provided on an inner end portion of the lower end circumference of the conical nozzle head 1. The second inlet 22 and the second outlet 23 are of a semi-circular hole shape, and the second powder channel 21 semi-cylinder shape. When the conical nozzle head 1 is sleeved in the conical nozzle cover 2, the first inlet 12 and the second inlet 22 are relatively provided to form a circular hole, the first powder channel 11 and the second powder channel 12 are relatively provided to form a cylinder, and the first outlet 13 and the second outlet 23 are relatively provided to form a circular hole. A cavity in the conical nozzle head 1 is used as a laser inlet. The first inlet 12 and the second inlet 22 are used as cladding powder inlets. Cladding powder sequentially passes through the first inlet 12 (the second inlet 22), the first powder channel 11 (the second powder channel 21) and the first outlet 13 (the second outlet 23) before flowing in. A groove on an upper end of the conical nozzle cover 2 is used as a cooling water inlet. When a laser cladding operation starts, a cladding material is added to a surface of a substrate and the cladding material melts and solidifies together with a thin layer on the surface of the substrate by using a laser beam with a high energy density, so that a material addition cladding layer metallurgically bonded with the surface of the substrate is formed on the surface of the substrate. In the present invention, in a powder feeding process, a channel including the first inlet 12, the first powder channel 11, the first outlet 13, the second inlet 22, the second powder channel 21, and the second outlet 23 is formed in a gap between the outer wall of the conical nozzle head 1 and the inner wall of the conical nozzle cover 2, and powder flows in through the channel. This increases a width of the powder feeding path between the outer wall of the conical nozzle head 1 and the inner wall of the conical nozzle cover 2, thereby improving powder feeding efficiency.

Figure 10:
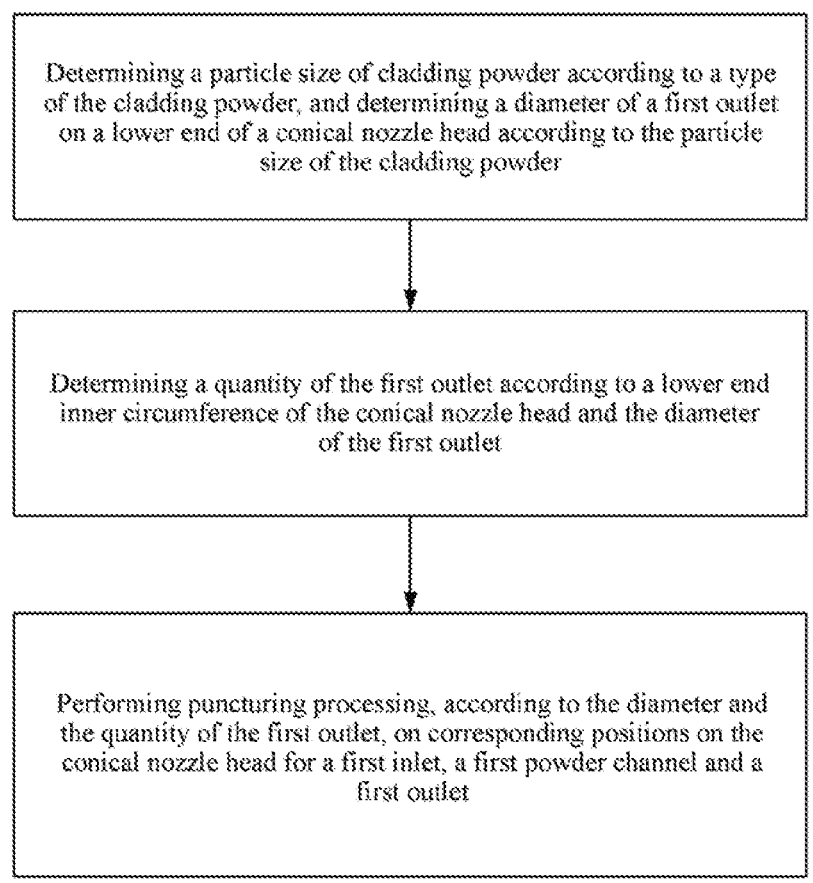
FIG. 10 is a flowchart of a puncturing method for a laser cladding nozzle apparatus according to the present invention.

As shown in FIG. 10, FIG. 10 is a puncturing method for a laser cladding nozzle apparatus according to the present invention, where the puncturing method requires the laser cladding nozzle apparatus described above, and the puncturing method includes the following steps:

step 1: determining a particle size of cladding powder according to a type of the cladding powder, and determining a diameter of the first outlet 13 on the lower end of the conical nozzle head 1 according to the particle size of the cladding powder;

step 2: determining a quantity of the first outlet 13 according to a lower end inner circumference of the conical nozzle head 1 and the diameter of the first outlet 13, where a calculation formula is:

the quantity of the first outlet 13=the lower end inner circumference of the conical nozzle head 1÷the diameter of the first outlet 13; and step 3: performing puncturing processing, according to the diameter and the quantity of the first outlet 13, on corresponding positions on the conical nozzle head 1 for the first inlet 12, the first powder channel 11 and the first outlet 13.

In the present invention, the diameter of the first outlet 13 can be adjusted according to the particle size of the fed cladding powder, so that the first outlets 13 are evenly distributed on the conical nozzle head. In this way, nanometer powder is used and the conical nozzle head 1 can use the nanometer cladding powder to perform powder feeding, thereby reducing nanometer powder converging in a powder feeding process.

TABLE 1

(Table 1 compares the diameter with the quantity of the first outlet)

| Powder type | Powder particle size | Lower end inner circumference (mm) | Diameter (mm) of first outlet | Quantity of first outlet |
|---|---|---|---|---|
| Micron level | 48 microns (300 meshes) | 27 | 0.05 | 540 |
| | 75 microns (200 meshes) | 27 | 0.1 | 270 |
| | 150 microns (100 meshes) | 27 | 0.2 | 135 |
| Nanometer level | 100 nanometers | 27 | 0.0001 | 270000 |
| | 200 nanometers | 27 | 0.0002 | 135000 |

All specific implementations of the present invention are described above, a person skilled in the art should understand that the described specific embodiments are merely exemplary and are not intended to limit the scope of the present invention. Any equivalent modification or variation made by a person skilled in the art according to the spirit of the present invention shall fall within the protection scope defined by the claims of the present invention.

What is claimed is:

1. A laser cladding nozzle apparatus, wherein the laser cladding nozzle apparatus is mounted on a laser head, and the laser cladding nozzle apparatus comprises a conical nozzle head, wherein the conical nozzle head is connected to an inner side of the laser head; the conical nozzle head comprises a plurality of first powder channels, a plurality of first inlets is evenly distributed on an upper end circumference of the conical nozzle head, a plurality of first outlets is evenly distributed on a lower end circumference of the conical nozzle head, each of the plurality of first inlets is in communication with each of the plurality of first outlets through each of the plurality of first powder channel, and a size and a quantity of the plurality of first inlets are the same as those of the plurality of first outlets;

wherein the plurality of first inlets and the plurality of first outlets are of a semi-circular hole shape, the plurality of first inlets are provided on an outer end portion of the upper end circumference of the conical nozzle head, the plurality of first outlets are provided on an outer end portion of the lower end circumference of the conical nozzle head, and the plurality of first powder channels are provided on an outer wall of the conical nozzle head.

2. The laser cladding nozzle apparatus according to claim 1, further comprises a conical nozzle cover, wherein the conical nozzle head is sleeved in the conical nozzle cover, a plurality of second powder channels matching the plurality of first powder channel are provided on an inner wall of the conical nozzle cover, a plurality of second inlets matching the plurality of first inlets are provided on an inner end portion of the upper end circumference of the conical nozzle head, and a plurality of second outlets matching the plurality of first outlets are provided on an inner end portion of the lower end circumference of the conical nozzle head.

3. The laser cladding nozzle apparatus according to claim 1, wherein the laser cladding nozzle apparatus further comprises a cover, wherein the cover is sleeved on an upper end portion of the conical nozzle cover and is connected to an outer side of the laser head.

4. A puncturing method for a laser cladding nozzle apparatus, wherein the puncturing method requires the laser cladding nozzle apparatus according to claim 1, and the puncturing method comprises the following steps:

step 1: determining a particle size of cladding powder according to a type of the cladding powder, and determining a diameter of the first outlet on the lower end of the conical nozzle head according to the particle size of the cladding powder;

step 2: determining a quantity of the first outlet according to a lower end inner circumference of the conical nozzle head and the diameter of the first outlet, wherein a calculation formula is:

the quantity of the first outlet=the lower end inner circumference of the conical nozzle head÷the diameter of the first outlet; and step 3: performing puncturing processing, according to the diameter and the quantity of the first outlet, on corresponding positions on the conical nozzle head for the first inlet, the first powder channel and the first outlet.

* * * * *